(12) United States Patent
Heathcote (10) Patent No.: US 10,104,830 B2
(45) Date of Patent: Oct. 23, 2018

(54) ROW PLANTER ASSEMBLY

(71) Applicant: COTE AG TECHNOLOGIES, LLC, West Des Moines, IA (US)

(72) Inventor: Chad Heathcote, West Des Moines, IA (US)

(*) Notice: Subject to any disclaimer, the term of this patent is extended or adjusted under 35 U.S.C. 154(b) by 59 days.

(21) Appl. No.: 15/148,081

(22) Filed: May 6, 2016

(65) Prior Publication Data
US 2017/0318740 A1 Nov. 9, 2017

(51) Int. Cl.
A01C 5/06 (2006.01)
A01C 7/04 (2006.01)
A01C 7/10 (2006.01)

(52) U.S. Cl.
CPC .............. *A01C 5/064* (2013.01); *A01C 7/046* (2013.01); *A01C 7/105* (2013.01); *A01C 7/102* (2013.01)

(58) Field of Classification Search
CPC ........... A01C 5/064; A01C 5/062; A01C 5/06; A01C 5/00; A01C 7/046; A01C 7/044; A01C 7/042; A01C 7/04; A01C 7/00; A01C 7/102; A01C 7/10; A01C 7/08
See application file for complete search history.

(56) References Cited

U.S. PATENT DOCUMENTS

| | | | |
|---|---|---|---|
| 5,842,428 A | 12/1998 | Stufflebeam et al. |
| 6,748,885 B2 | 6/2004 | Sauder et al. |
| 7,717,048 B2 | 5/2010 | Peterson, Jr. et al. |
| 8,371,239 B2 | 2/2013 | Rans et al. |
| 8,479,671 B2 | 7/2013 | Shoup |
| 8,522,889 B2 | 9/2013 | Adams et al. |
| 8,776,702 B2 | 7/2014 | Bassett |
| 8,850,998 B2 | 10/2014 | Garner et al. |
| 8,924,092 B2 | 12/2014 | Achen et al. |
| 2008/0110382 A1 | 5/2008 | Brockmeier |
| 2010/0192818 A1 | 8/2010 | Garner et al. |
| 2014/0026748 A1 | 1/2014 | Stoller et al. |
| 2014/0262378 A1 | 9/2014 | Connors et al. |
| 2015/0319919 A1 | 11/2015 | Sauder et al. |

OTHER PUBLICATIONS

International Searching Authority, "Invitation to Pay Additional Fees and, Where Applicable, Protest Fee", for PCT/US2017/031223, dated Jul. 14, 2017, 2 pages.
International Searching Authority, "Notification of Transmittal of The International Search Report and The Written Opinion of the International Searching Authority", for PCT/US2017/031223, dated Sep. 12, 2017, 10 pages.

*Primary Examiner* — Christopher J. Novosad
(74) *Attorney, Agent, or Firm* — Zarley Law Firm, P.L.C.

(57) ABSTRACT

A row planter assembly having offset track assemblies, a downforce control assembly, a furrow assembly, a seed metering assembly, and a seed delivery assembly.

12 Claims, 12 Drawing Sheets

ROW PLANTER ASSEMBLY

BACKGROUND OF THE INVENTION

This invention is directed to implements used in various industries and more particularly a row planter assembly and cutter assembly used with an automatic control system.

Row planter assemblies are well known in the art. Existing planter assemblies include a seed meter delivering seed through a drop tube into a furrow opened by a dual disc opener. While useful, problems still exist. Current planters are inconsistent in seed spacing and accuracy which affects enhanced yield performance and productivity. Also, not only is the spacing between rows limited, but due to the weight of the row planter, undesirable soil compaction occurs. Therefore, a need exists in the art for a device that addresses these deficiencies.

An objective of the present invention is to provide a row planter assembly that increases seed placement accuracy.

Another objective of the present invention is to provide a row planter assembly that reduces soil compaction.

A still further objective of the present invention is to provide a row planter assembly configured to provide more narrow rows.

These and other objectives will be apparent to those skilled in the art based upon the following written description, drawings and claims.

SUMMARY OF THE INVENTION

A row planter assembly having a pair of off-set track or wheel assemblies mounted to a chassis. Also mounted to the chassis is a downforce central assembly having a contact wheel connected to a first swing arm. The first swing arm is pivotally connected to a bracket. A pair of second swing arms are pivotally connected to the bracket at one end and extend through a fulcrum bore at the opposite end. A first cylinder is connected to and extends between the bracket and the second swing arms. A second cylinder is connected to and extends between the first swing arm and the contact wheel.

Connected to the chassis is a furrow assembly having an opening disc, a furrow plow, and a pair of shaping wheels. Also connected to the chassis is a seed meter assembly having a pair of seed plates disposed within a housing. The housing has a plurality of conduits and chambers that are connected to and in communication with a vacuum source. The seed meter assembly also has a sensor adjacent the seed plate that is connected to a computer. When the sensor detects a skip, the computer accelerates the rotational speed of the seed plate toward a drop zone.

Mounted to the frame below the seed meter assembly is a seed delivery assembly. The seed delivery assembly has a pair of flexible and conformable discs mounted to a shaft that frictionally hold a seed there between. A separator, positioned at the top of the discs spreads the discs apart to receive a seed from the seed meter assembly. A second separator is positioned at the bottom of the discs that spreads the discs apart to deliver the seed to the furrow.

DETAILED DESCRIPTION OF THE PREFERRED EMBODIMENT

Figure 1:
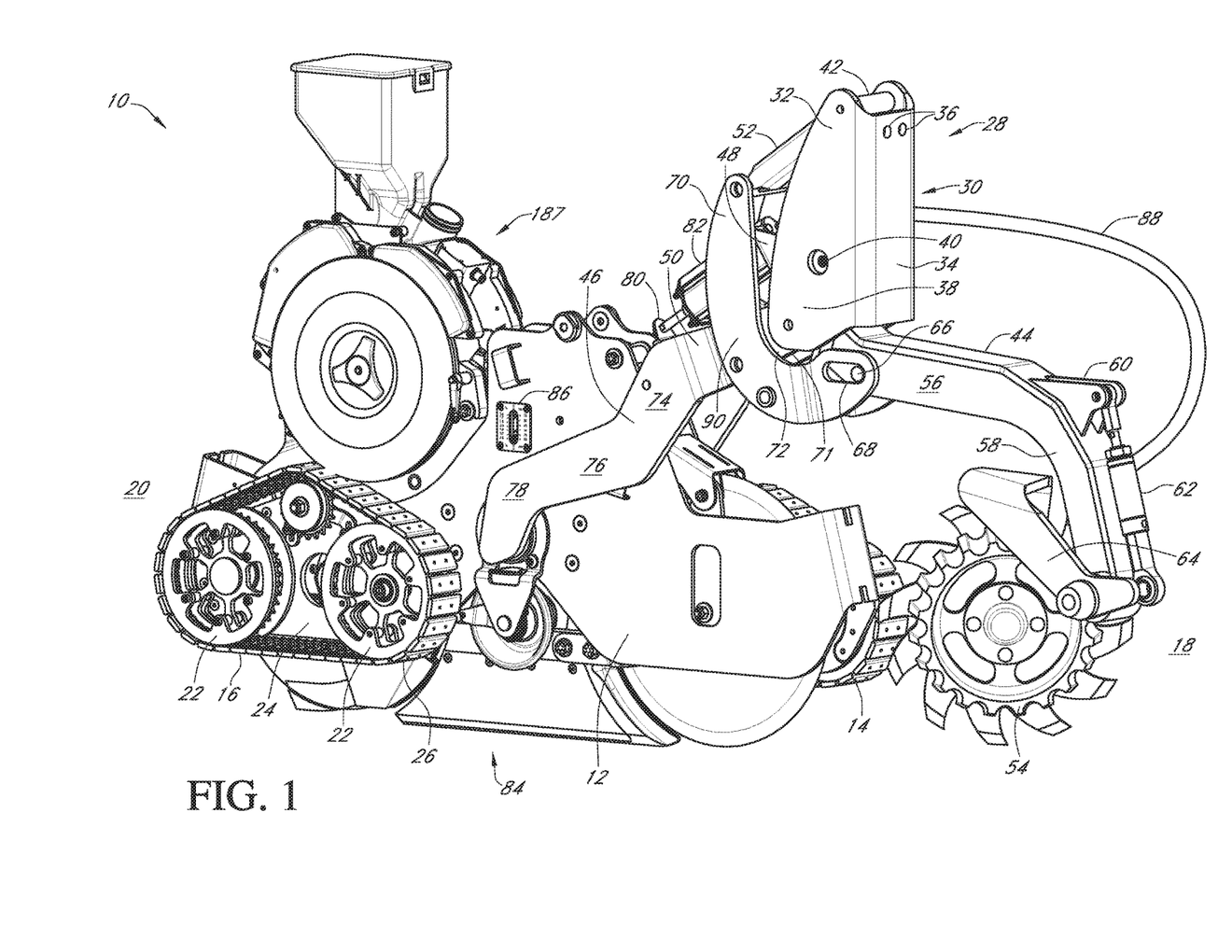
FIG. 1 is a perspective view of a row planter assembly.

Referring to FIG. 1 is a row planter assembly 10 having a chassis 12. Connected to each side of the chassis 12 are offset track or wheel assemblies 14 and 16, with the first track assembly 14 located at the front end 18 of one side of the assembly 10 and the second track assembly 16 located, at the rear end 20 of the other side.

Each track assembly 14 and 16 has a plurality of wheels 22 that are rotatably connected to a mounting plate 24. The mounting plate 24 is connected to the chassis 12. Extending around wheels 22 is a continuous track 26. The offset of track assemblies 14 and 16 allow for a narrow side-by-side row spacing. With the offset configuration, two row units fit side by side within the same footprint as a present single row unit and allows for row spacing as narrow as 6 inches. In addition, the offset configuration reduces soil compaction, increases the planted population, improves the rooting area, and leads to higher yields.

The row planter assembly 10 also has a downforce control assembly 28. The downforce control assembly 28 includes a nose bracket 30 having a pair of spaced side walls 32 that extend outwardly from a back wall 34. The back wall 34 has a plurality of openings 36 that receive a bolt (not shown). The U-bolt fits around the toolbar of a farm implement and is attached to the nose bracket 30 to secure the row unit assembly 10 to the farm implement. Not only does this provide for easy attachment, but it also allows existing planters to be easily retrofitted.

The nose bracket 30 has a plurality of shafts 38, 40, and 42 that are attached to and extend between side walls 32. A first swing arm 44 and a pair or second swing arms 46 are pivotally attached to a lower shaft 38. A dampener bracket 48 and a first cylinder 50 are pivotally connected to the middle shaft 40. A pair of support arms 52 are pivotally attached to the top shaft 42.

The first swing arm 44 extends from the nose bracket 30 to a contact wheel 54. The contact wheel 54 is of any type, such as a trash wheel, a row cleaner, a depth wheel, or the like. The first swing arm 44 has a generally horizontal section 56 and a generally vertical or angled section 58. Connected to a bracket 60 on the first swing arm 44 at a first end is a second cylinder 62. The cylinder 62 is of any type and preferably is a hydraulic single acting cylinder. The cylinder 62 is, connected at an opposite end to a wheel bracket 64 that is connected to the contact wheel 54. At an end adjacent the nose bracket 30, the first swing arm 44 has cam 66 that extends outwardly from a side of arm 44 and is received in a cam slot 68 of a i-shaped connecting arm 70. The connecting arm 70 extends arcuately from a first end having the cam slot 68 to a second end that is pivotally connected to support arm 52. Connecting arm 70 is also pivotally connected to the second swing arms 46.

The pair of second swing arms 46 extend from the nose bracket 30 and are pivotally connected at an opposite end to the chassis 12. The second swing arms 46 are of any shape and, preferably, have a connecting section 71 that terminates in a transverse section 72. The transverse section 72 terminates in a first angled section 74, that extends to a second angled section 76, that extends to a third angled section 78. Connected to the first angled section 74 of swing arms 46 is a bracket 80. Bracket 80 is connected to the first cylinder 50 at an end opposite the cylinder's connection to the middle shaft 40 of the nose bracket 30. Bracket 80 is also connected to a dampener 82 that extends between brackets 80.

The downforce control assembly 28 provides a downward force to the chassis 12 and through to a furrow assembly 84 that has a desired depth preset with a depth adjustment gauge 86. As the planter assembly 10 traverses a field, the contact wheel 54 senses the hardness of the soil. When the soil is hard, the contact wheel 54 moves upwardly and when the soil is soft, the contact wheel moves downward.

The movement of the contact wheel 54 transfers force to the second cylinder 62 causing cylinder 62 to retract or extend. When cylinder 62 retracts, fluid flows via line 88 to the first cylinder 50 causing first cylinder 50 to extend overcoming a spring 90 bias. When second cylinder 62 extends, fluid flows from first cylinder 50 to second cylinder 62 causing first cylinder 50 to retract. The dampener 82 dampens cylinder 50 adjustments based on ground vibration.

When the first cylinder 50 extends, force is transferred to bracket 80 then thru a downforce spring and then to second swing arms 46 causing the downforce spring to be further compressed and apply an additional downward force on the chassis 12 and the furrow assembly 84. In contrast, when cylinder 50 retracts, force is transferred to bracket 80 and then through a downforce spring to second swing arm 46 causing the downforce spring to be less compressed and apply less downward force on the chassis 12 and the furrow assembly 84.

As the chassis 12 traverses the ground the second swing arm 46 may move upwardly or downwardly. When the second swing arm 46 moves upwardly, it moves a shaft 38 in connection with J-arm 70 to move J-arm 70 upwardly. J-arm 70 is pivotally connected to a control arm 52 causing the J-arm motion to remain in parallel with nose bracket 30 front face 34. J-arm 70 is also connected to a cam 68 that translates the motion of the second swing arms 46 to the first swing arm 44. Thus, the first swing arm 44, the second swing arms 46 and the connecting arm 70 all rise and are lowered together, such that the outward ends of the first and second swing arms 44 and 46 remain in the same horizontal plane. Further, the configuration of the downforce control assembly 28 provides a balanced down force that is +/− five percent of the desired preset downforce.

Figure 2:
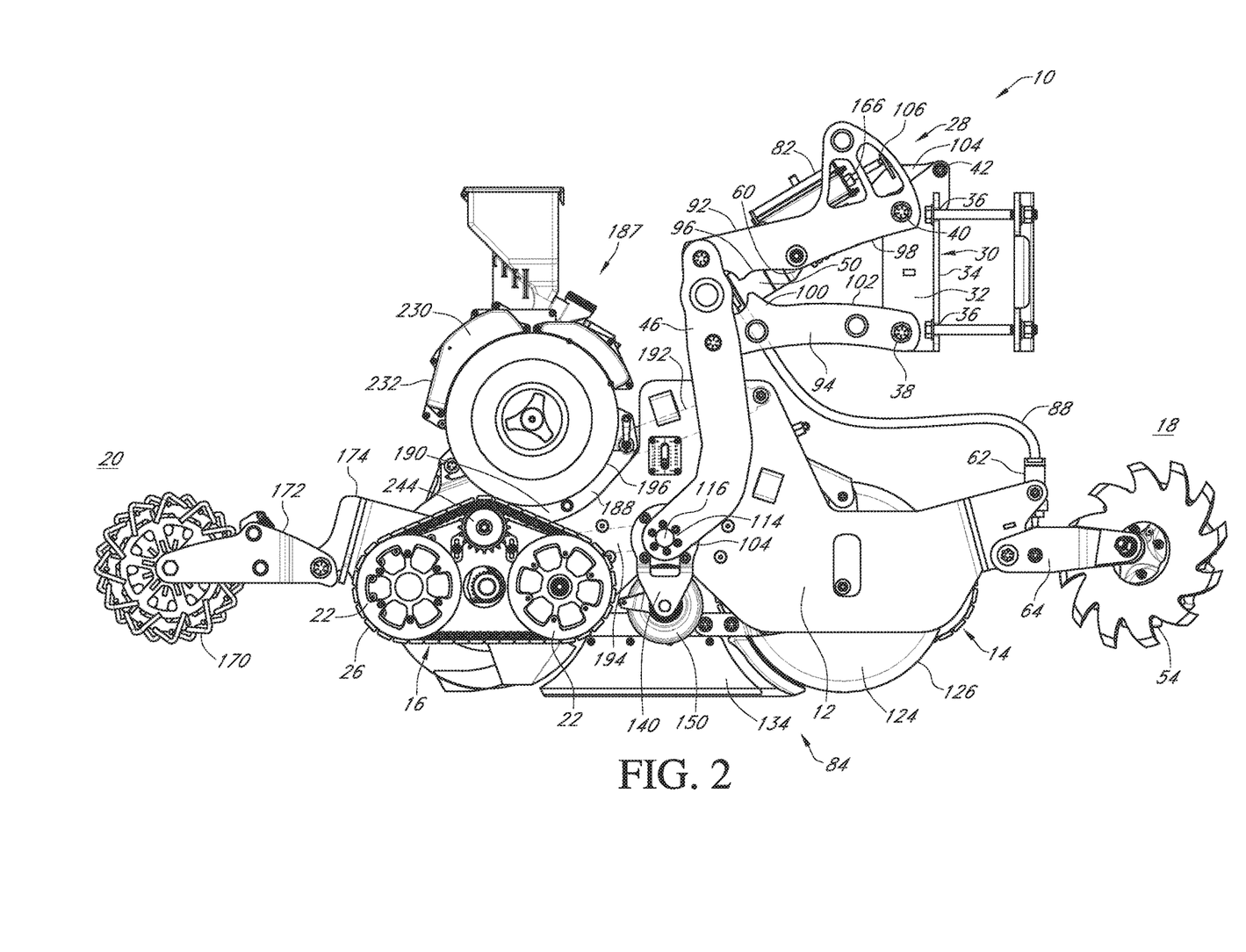
FIG. 2 is a side view of a row planter assembly.

In an alternative embodiment, as best shown in FIG. 2, the downforce control assembly 28 has a first arm 92 pivotally connected to the middle shaft 40 of the nose bracket 30 and a second lower arm 94 pivotally connected to the lower shaft 38 of the nose bracket 30. Both the first arm 92 and second arm 94 extend from the nose bracket 30 and are pivotally connected to fulcrum arm 46. The first arm 92 has a protrusion 96 on its lower edge 98 and the second arm 94 has a protrusion 100 on its upper edge 102. Both protrusions 96 and 100 act as stops to restrict the movement of first arm 92 and second arm 94. Arms 92 and 94 are of an asymmetrical design, being that first arm 92 is longer in length than the second arm 94. The asymmetrical design of these control arms causes the lower section of the fulcrum arm 46 to move forward when the chassis 12 is moving upwardly. The forward motion of chassis 12 helps to prevent build up or clogging of chassis 12 components with soil.

Connected to the top shaft 42 of the nose bracket 30 is a cylinder bracket 104. The cylinder bracket 104 has an upwardly extending flange 106 that connects to one end of the dampener 82. The first cylinder 50 is connected to the cylinder bracket 104 at one end and to bracket 60 at the opposite end through a downforce spring. Bracket 60, which is also connected to the dampener 82, is pivotally connected to the first arm 92.

When contact wheel 54 rises, wheel bracket 64 compresses second cylinder 62, fluid flows from the second cylinder 62 to the first cylinder 50 through a hose 88. As fluid flows into first cylinder 50, the first cylinder extends causing the downforce spring to be further compressed and apply more downforce on the first arm 92 and second arm 94 that are pivotally connected to the fulcrum arm 46.

When contact wheel 54 sinks into the soil, wheel bracket 64 is lowered which allows second cylinder 62 to extend. As second cylinder 62 extends, first cylinder 50 retracts as fluid flows from the first cylinder 50 to the second cylinder 62. As the first cylinder 50 retracts, this causes the downforce spring to be less compressed and apply less downforce on the arms 92 and 94 that are pivotally connected to the fulcrum arm 46.

Figure 3:
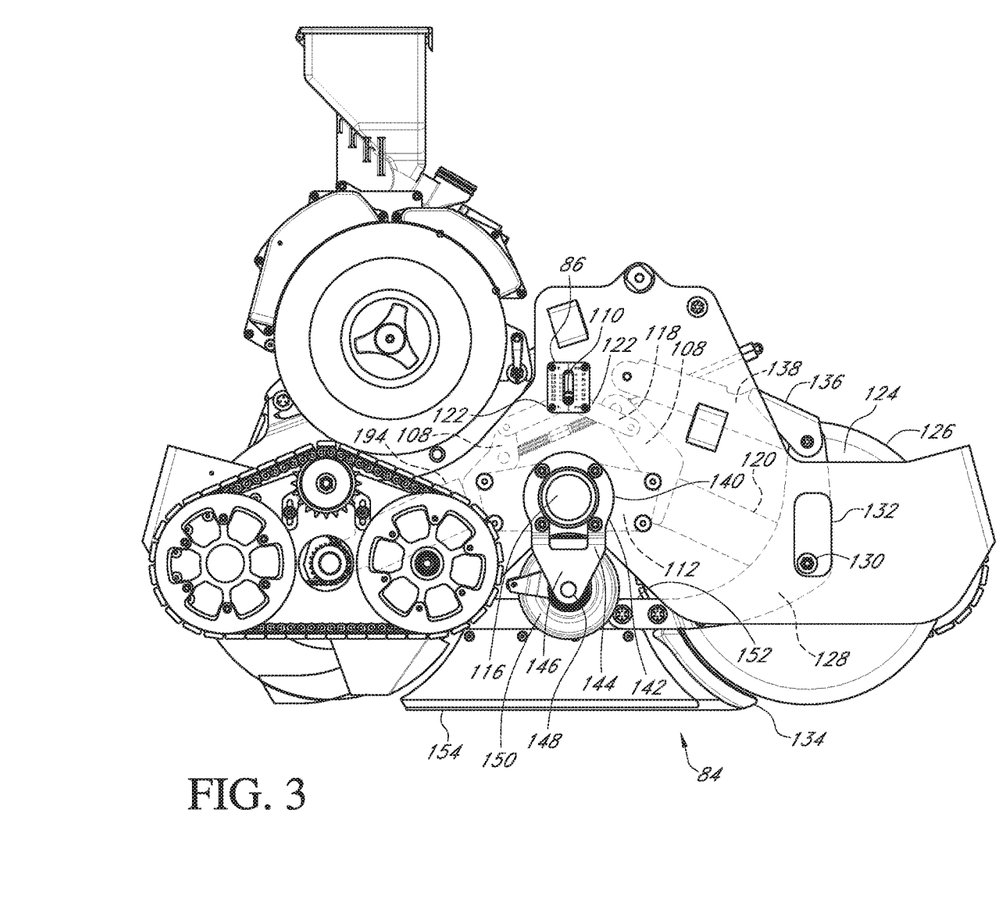
FIG. 3 is a side sectional view of a row planter assembly.
Figure 4:
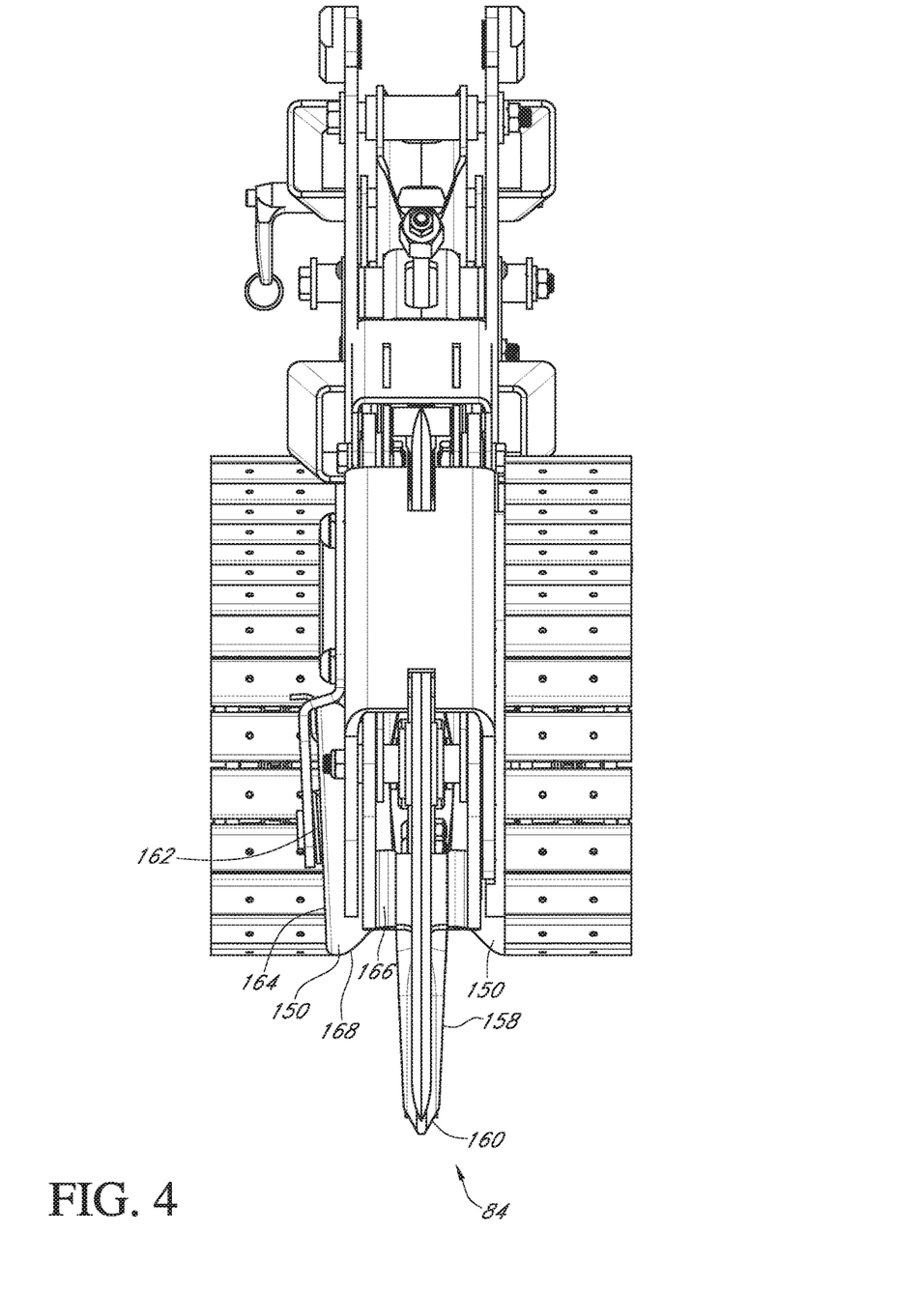
FIG. 4 is an end view of a furrow assembly.

The furrow assembly 84 includes a pair of bracket arms 108 connected to a gauge screw 110 of the adjustable depth gauge 86 at one end and to a mounting plate 112 at the opposite end. Mounting plate 112 fits around fulcrum bore 114 that receives the connecting shaft 116 of second swing arms 46. Bracket arms 108 have cam slots 118 between ends.

A support arm 120 is connected to one bracket arm 108 by a link arm 122 that is received within cam slot 118 at one end. The cam pin is received within the depth gauge 110 to maintain the ends of both rear support arm 194 and front support arm 120 in a horizontal plane. At an opposite end, support arm 120 is pivotally connected to an opening disc 124. Preferably, the opening disc 124 has a tangent convexed cutting edge 126 so that the disc 124 cuts through soil and residue more easily with reduced plowing and hair pinning. The opening disc 124 is also connected to an arcuate support arm 128 by a bolt 130 that extends through the lower pivot point of the arcuate support arm 128, front pivot point of support arm 120, and through the axis of the opening disc 124 with access through a slot 132 in the chassis 12.

The arcuate support arm 128 is connected to a furrow plow 134 at one end and is pivotally connected to an arm joint 136 at the opposite end. The arm joint 136 of support arm 138 that is pivotally connected to chassis 12.

Mounted about bore 116 is a shaping wheel bracket 140. The shaping wheel bracket 140 has a ring section 142 that fits around bore 116 and terminates in a pair of outwardly extending flanges 144. The flanges 144 terminate in a downwardly extending triangle shaped section 146. Adjacent an apex of the triangle shaped section 146 is an axle 148 that extends through each shaping wheel bracket 140 and terminates before contacting the furrow plow 134. Mounted to the axle 148 on either side of the furrow plow 134 are shaping wheels 150.

The furrow plow 134 has a top 152, a bottom edge 154, and opposite sides 156. The sides 156 have a first section 158 that angles inwardly from the top 152 toward the bottom edge 154 and a second section 160 that angles inwardly from the first section 158 to the bottom edge 154.

Positioned about axle 148 between shaping wheel bracket 140 and shaping wheels 150 are springs 162 that biases shaping wheels 150 inwardly against furrow plow 134. The shaping wheels 150 have an outer edge 164, an inner edge 166, and a shaping surface 168 that extends therebetween. Preferably, the shaping surface 168 is contoured inwardly in an S-shape from the outer edge 164 to an inner edge 166.

Extending outwardly from the rear end 20 of the chassis 12 are furrow closing wheel or wheels 170. The closing wheel or wheels 170 are rotatably connected to a support arm 172 that is pivotally connected to a mount 174. The mount 174 is connected to the chassis 12.

When the downforce assembly 28 exerts force, the force is transferred through connecting shaft 116 of fulcrum arm 46 to the fulcrum bore 114 allowing the chassis 12 to move upwardly or downwardly and pivot independently of the toolbar.

As the planter 10 moves through a field, the opening disc 124 cuts through the soil and residue. The furrow plow 134 follows behind and cuts a furrow. The first section 158 and second section 160 of the sides 156 of the furrow plow 134 guide the soil 178 upwardly and outwardly. The shaping surface 168 of the shaping wheels 150 capture the soil to form narrow soil ridges on either side of the furrow, instead of permitting the soil to spread outwardly. The sides 156 of the furrow plow 134 work to prevent furrow sidewalls from falling in, disrupting seed depth and spacing control. A sprayer 180 having a nozzle 182 and a fluid line 184 connected to a fluid source (not shown) is mounted to the chassis 12 downstream from a seed metering and delivery assembly 186. Preferably, the sprayer (not shown) has two nozzles that angle outwardly to provide fluid to the side walls of the furrow. The nozzles have a reduced cross section and fluid is forcibly delivered by a pressurized pump creating a fluid stream able to penetrate the soil to be delivered below the seed depth without requiring mechanical parts to dig a trench. The fluid is of any type, such as, water, fertilizer, pesticide, insecticide, or the like. Once a seed has been deposited and the furrow sprayed, the closing wheel or wheels 170 push the soil back into the furrow covering the seed.

Multi-Hybrid Low Friction Seed Meter

Figure 5:
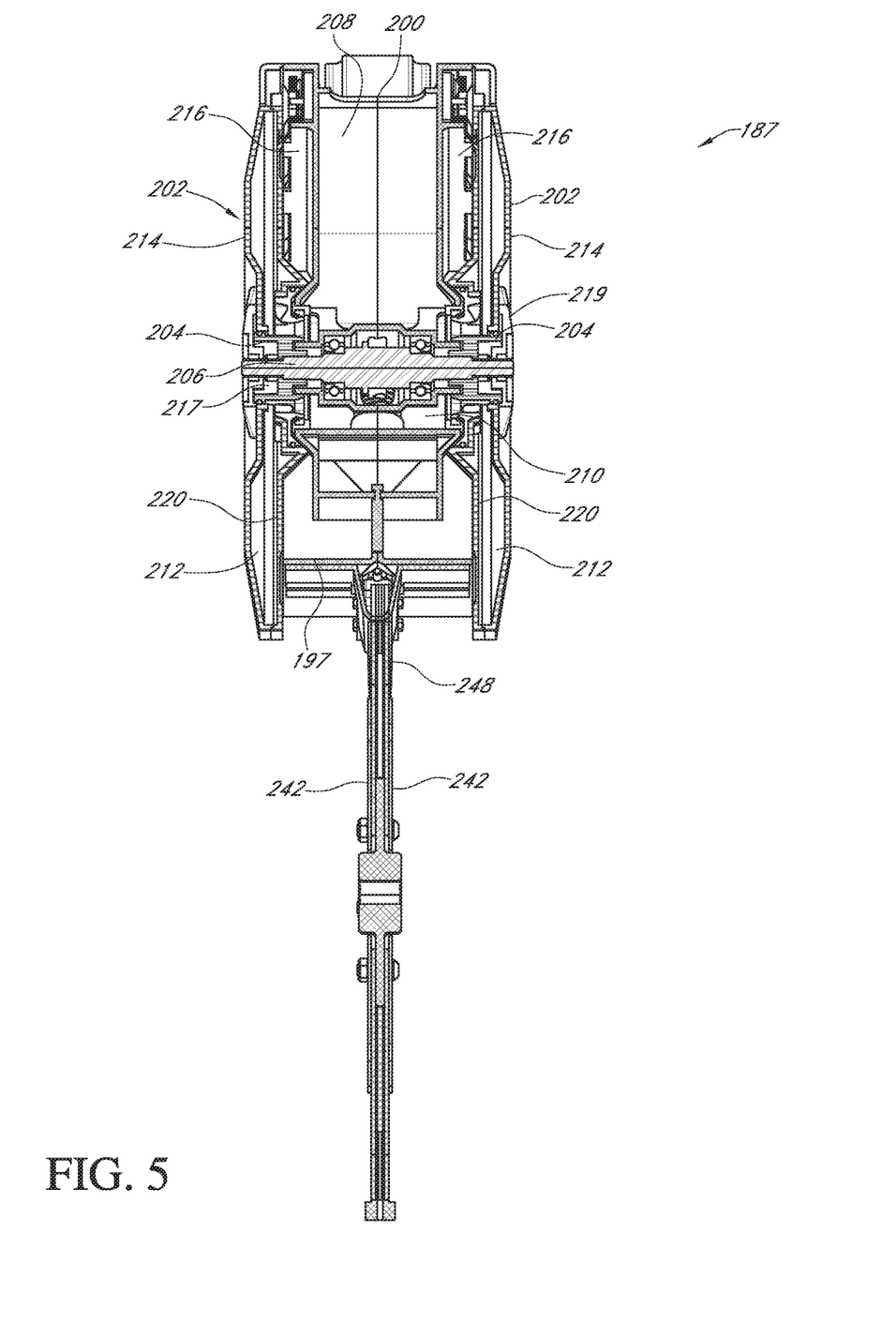
FIG. 5 is a partial sectional end view of a seed metering and delivery assembly.

Mounted to a support cradle 188 is a seed meter assembly 187. The support cradle 188 includes a support plate 190 pivotally connected to an upper support arm 192, a lower support arm 194. The upper support arm 192 is connected to the chassis 12 and the lower support arm 194, is connected to a bracket arm 108. The pivoting of the cradle 188 in relation to support arms 192 and 194 keeps the seed metering and delivery assembly in vertical alignment.

Figure 5A:
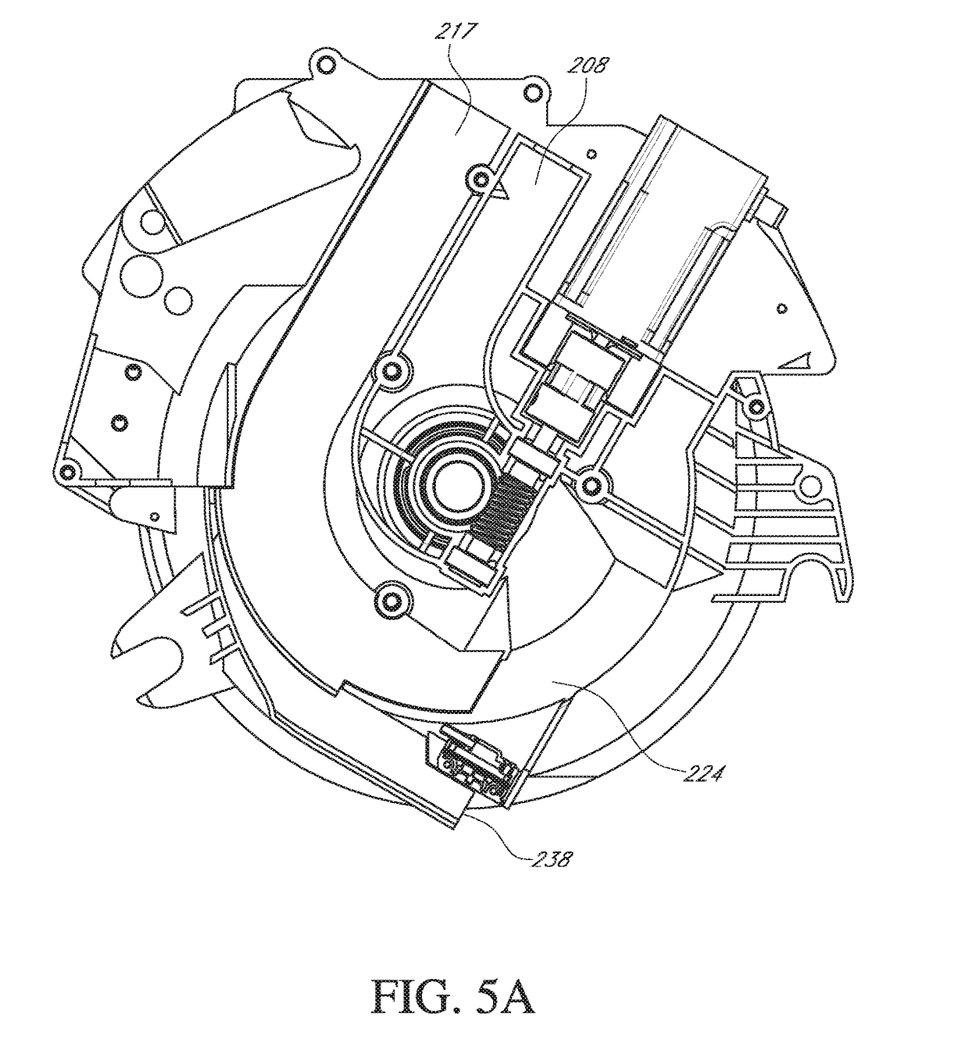
FIG. 5A is a side sectional view of a multi-hybrid seed metering assembly.

The seed meter assembly 187 is supported by a rear saddle pivot and a front saddle pivot and is retained by a pin. The seed meter assembly 187 is of any type and preferably is a multi-hybrid low friction type. The multi-hybrid low friction seed meter 187 has a housing 197 with a plurality of inlet ports (not shown) and an outlet port 200. The outlet port 200 is connected to a vacuum (not shown). On either side of and within the housing 197 are a pair of hollow seed discs 202 in parallel spaced relation that are connected to a hub 204 of a drive shaft 206.

Extending from and in communication with the outlet port 200 is a discharge conduit 208. The discharge conduit 208 extends from the outlet port 200 to a transverse conduit 210 adjacent the drive shaft 206. Transverse conduit 210 extends to either side of the meter housing 197 and are in communication with each hollow seed disc's air chamber 212 which is between seed plate 220 and disc drum 214 of the hollow seed disc 202. Between seed discs 202 and discharge conduit 208 is a makeup air chamber 216.

Figure 5B:
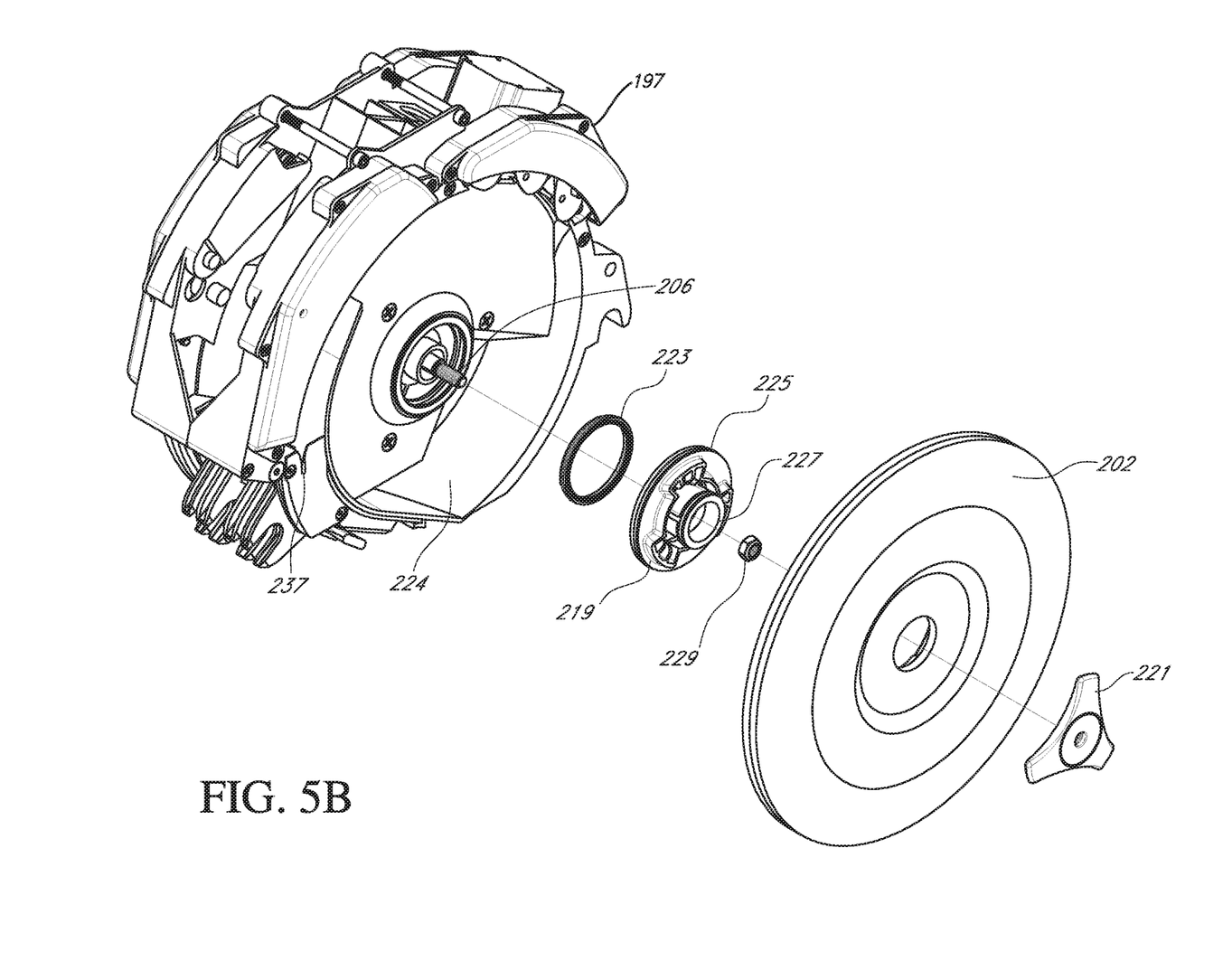
FIG. 5B is an exploded perspective view of a seed metering assembly.

Preferably, the ends of drive shaft 206 are threaded and extend through a coupler 219 that is indexed to the drive shaft 206 and retained by a coupling nut 229 that is threadably connected. The hollow seed plates 202 have a central opening that receives the coupling and indexes the hollow seed plate 202. A retaining nut 221 is threadably received upon the threaded ends of the drive shaft 206 to hold the seed plate 202 to the coupler 219. A rotary seal 223 fits around, the hub 204 while the coupler 219 has an inner disc seal 225 and an outer disc seal 227. Also, a coupling nut 229 is threadably received on the threaded shaft 206.

Figure 6:
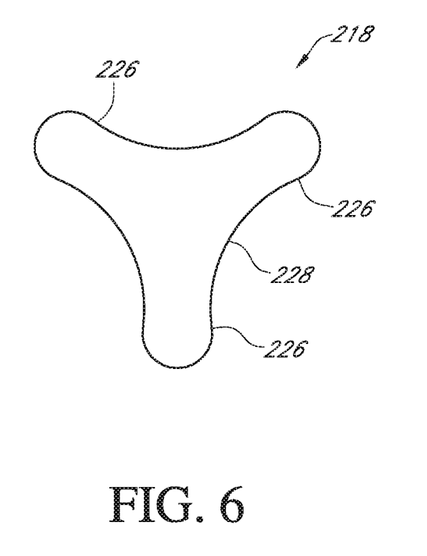
FIG. 6 is a cavity of a seed plate.

Positioned around an outer periphery of the seed plates 202 are a plurality of seed agitation cavities (not shown) with an aperture 218 that extends through the seed plates 220. In operation, suction is provided from the vacuum source, such that, air flows from the inlet ports (not shown) into the makeup air chamber 216 through apertures 218 and into the disc air chamber 212. From the disc air chamber 212, air flows through transverse conduit 210 to discharge conduit 208 through outlet port 200 creating a vacuum. As a result of the vacuum, seeds 222 from seed pool 224 are pulled onto the apertures 218 and held until the seed plates 202 move to a drop zone 238, where seeds 222 are forcibly removed so that seeds are dropped from aperture 218. The apertures 218 are of any shape and size but preferably have a plurality of narrowing legs 226 that extend from a central diameter 228 of the aperture 218. As a result, increased suction is provided by the legs 226 and central diameter 228 to hold the seed 222 within the aperture 218 without permitting debris to become stuck within the aperture 218.

Figure 7:
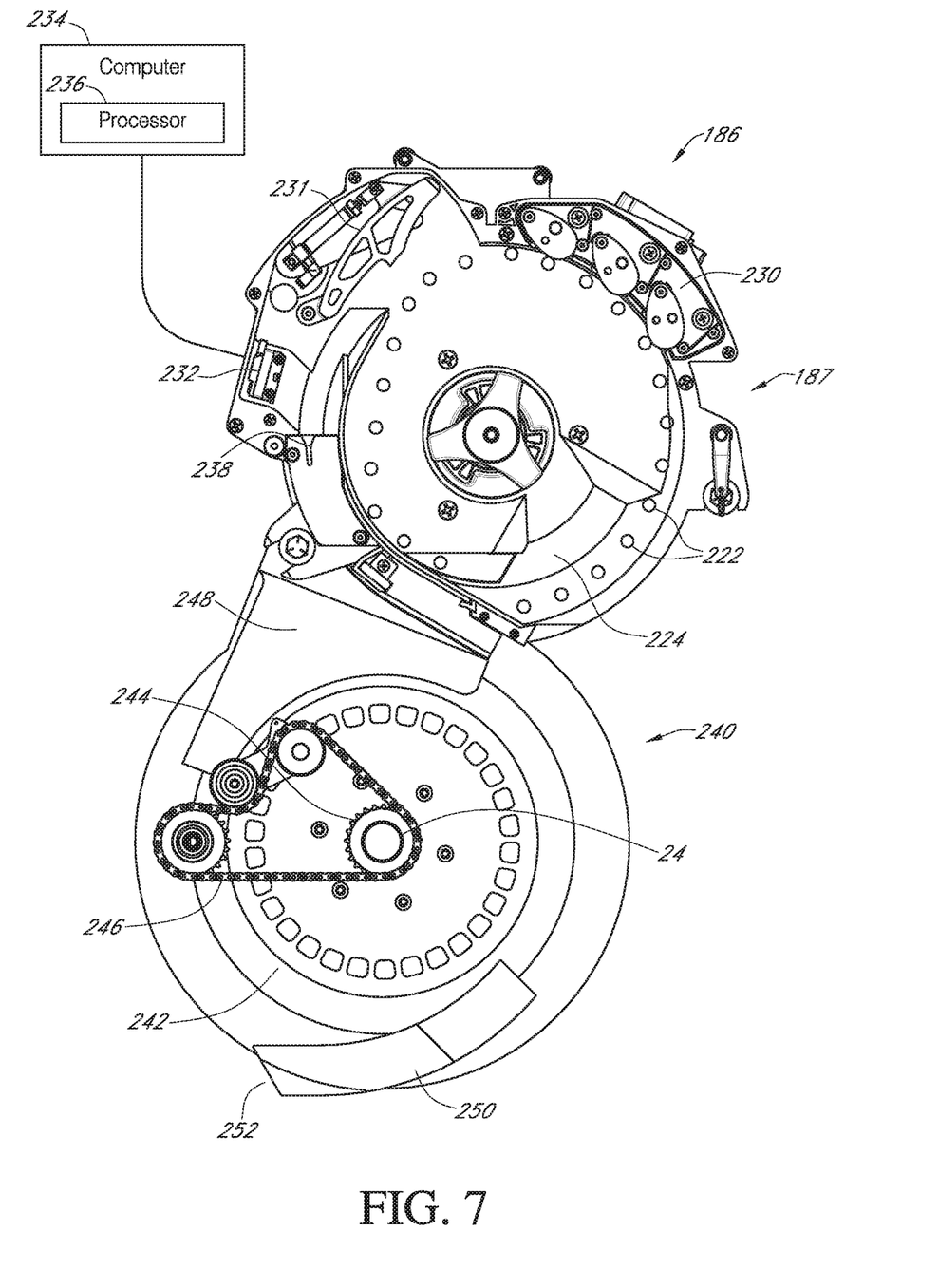
FIG. 7 is a side sectional view of a seed metering and delivery assembly.

Mounted within the housing 197 adjacent an outer periphery of the seed plate is a plurality of seed singulators 230. Each singulator 230 has a cam that follows the peripheral edge of the hollow seed disc 202. By reducing or increasing the diameter of the peripheral edge of the hollow seed disc 202, the amount of coverage each singulator 230 has over each aperture can be increased or decreased. Also mounted within the housing 197 is a seed deflector 231 that, when engaged, causes seed 222 to be diverted back into the seed pool 224 while the seed deflector 231 on the opposite side of the seed meter 186 is disengaged and allowing seed 222 to pass through to the drop zone 238. Also mounted within the housing 197 adjacent the seed meter plates 202 are sensors 232. The sensors 232 detect the presence of a seed 222 within apertures 218. The sensors 232 are connected electrically or wirelessly to a computer 234 having a processor 236. If the sensor 232 does not detect the presence of a seed 222 within an aperture 218, a signal is sent to the computer 234. As a result, the computer 234 sends a signal to an actuator (not shown), that accelerates the rotation of the drive shaft 206, so that there is no skip in the release of a seed 222 from the drop zone 238 of the seed plate 202 and even seed spacing is maintained.

Adjacent discharge conduit 208 are a pair of seed channels 217. The seed channels 217 extend from a first open end that are connected to separate and different seed hoppers (not shown) to a second end in communication with the seed pool 224.

Positioned below and in vertical alignment with the seed meter assembly 186, is a seed delivery assembly 240. The seed delivery assembly 240 is of any size, shape, and structure and in a preferred example has a pair of flexible discs 242 mounted to a drive shaft 24. Preferably, the drive shaft is connected to a sprocket 244 mounted to a wheel 22 on the rear track assembly by a belt, chain, or flexible shaft 246, but could also be controlled independently with an actuator. As a result, the flexible discs 242 rotate based upon the ground speed of the planter assembly 10.

Pivotally mounted to the lower support arm 194 through the drive shaft 24 and to the support cradle 188 at the top of the discs 242 adjacent the drop zone 238 is a first separator 248. The separator 248 is positioned to spread the discs 242 apart so that a seed may be dropped therebetween. Once the seed is received between the discs 242, then discs 242 return to their normal engaged position and frictionally hold the seed 222 in place between the discs 242. Mounted to the delivery frame at the bottom of discs 242 adjacent the ground is a second separator 250. The second separator 250 is positioned to spread the discs 242 apart at a planting zone 252 so that a seed is released into the furrow. The flexible discs 242 maintain accurate spacing between seeds 222 during delivery and the positioning of the planting zone 252 near the furrow drops the seed 222 without roll or bounce.

Figure 8:
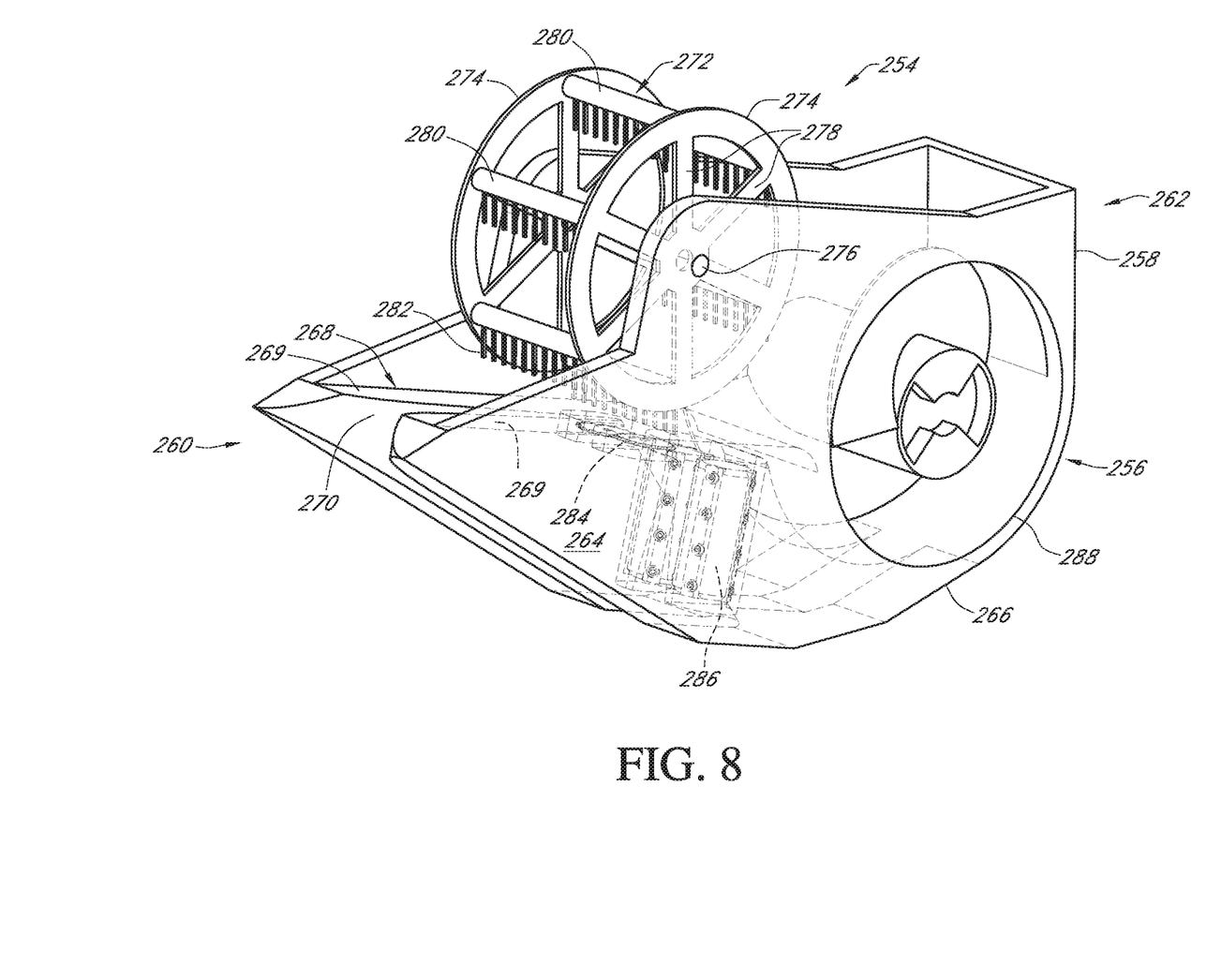
FIG. 8 is a perspective sectional view of a cutter assembly module.
Figure 9:
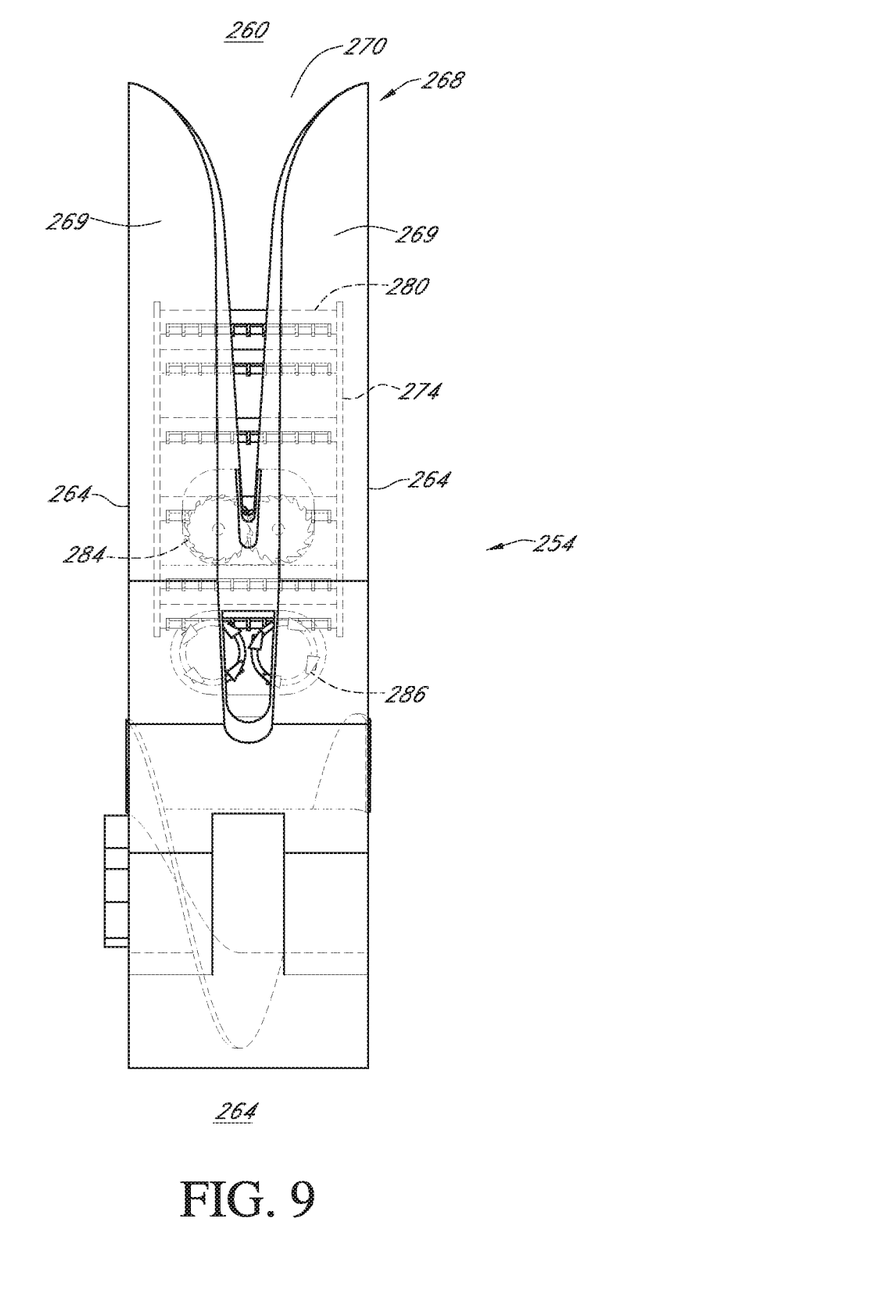
FIG. 9 is a top plan sectional view of a cutter assembly module.

Another implement is for a cutter assembly 254 comprised of a plurality of cutter modules 256. The modules 256 are connected together to form a selectable width header. The cutter assembly 254 may be mounted to the front of a combine or a tractor and/or combined with a thresher and pulled behind a vehicle.

Each cutter module 256 has a housing 258 with a first or front end 260, a second or rear end 262, a pair of side walls 264, an arcuate bottom wall 266, and an open top. At the front end 260 is a snap deck 268 mounted to the sidewalls 264 and having a pair of separated guides 269 that forma neck 270. The guides 269 assist in gathering crop material and funneling the crop material into the neck 270.

Pivotally mounted to the sidewalls 264 is a feeder 272. The feeder 272 is of any type and in one example has a pair of reels 274 connected to a shaft 276 by a plurality of radial arms 278. Extending between the reels 274 are transverse arms 280. Connected to the transverse arms 280 are tines 282.

Disposed within the housing 258 at the end of the neck 270 is a stem cutter 284 for cutting of crop material such as soybean and the like. Below the stem cutter 284 at the end of the neck 270 is a stock cutter 286 for cutting crop materials such as corn and the like. Disposed behind the stock cutter 286 is an auger made as a modular part that fits within openings 288 in the side walls 264.

Figure 10:
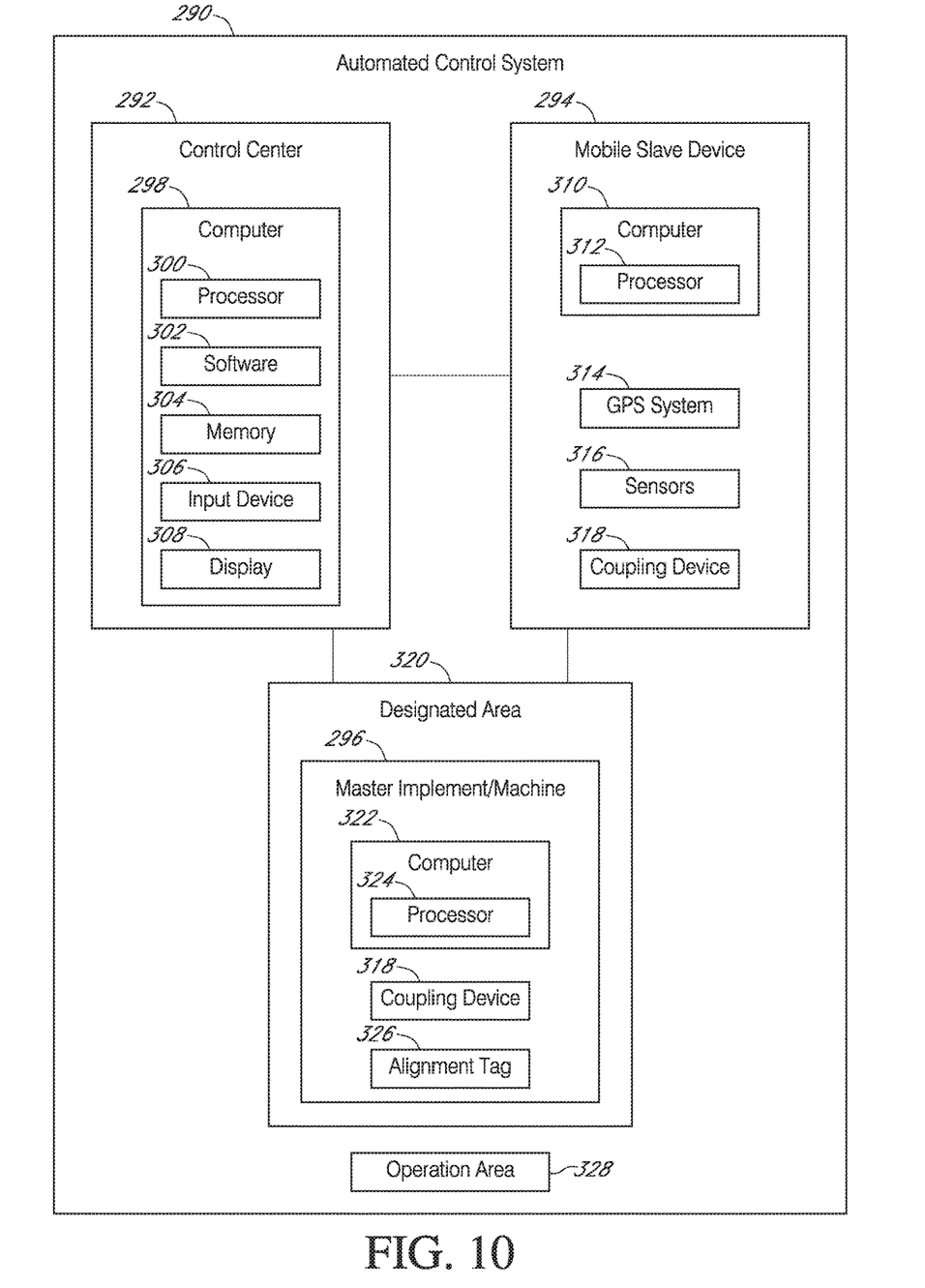
FIG. 10 is a block diagram of an environment of an automated control system.

Both the planter assembly 10 and cutter assembly 254 along with other implements and machines can be used with an automated control system 290. The automated control system 290 has a control center 292 that commands and monitors a mobile slave device 294 and a master implement/machine 296.

The control center 292 includes a computer 298 having a processor 300, software 302, memory 304, an input device 306, and a display 308.

The mobile slave device 294 is of any type including, as an example only, a tractor, combine, truck, or the like. The mobile slave device 294 has a computer 310 having a processor 312, a GPS system 314, a plurality of sensors 316 that monitor operational parameters and provide an optical avoidance, and a universal coupling device 318.

The master implement/machine 296 is of any type, such as, a planter, harvester, cultivator, sprayer, or the like and can extend beyond farming to other industries such as mining, construction, and the like. The master implements 296 are located in a pre-determined designated area 320 and include a computer 322 with a processor 324, and a universal coupling device 318.

To operate, operational parameters are input or downloaded into the computer 298, such as, weather conditions, field evaluation, soil condition and the like. Also, operational protocols for various process such as planting, harvesting, fertilizing and the like are input, downloaded or determined to or by the computer 298. Once set, an individual selects a desired proceeding and the computer 298 sends a signal activating a mobile slave device 294. Computer 298 monitors operational parameters of the mobile slave device 294 such as fuel level as an example. Should maintenance be needed, the computer 298 directs the mobile slave device 294 to a base station or a maintenance area. The base station will provide stores of fuel, seed, and grain off-loading and the like. The base station can be a non-mobile structure or a mobile unit, such as a trailer or master implement 296. The base station will have a universal coupling device 318.

If maintenance is not needed, the computer 298 directs the mobile slave device 294 to the needed master implement 296. The computer 298 does this by activating a signal on the implement 296 that is received by the mobile slave device 294. The mobile slave device 294 moves toward the signal, using the sensors 316 to avoid objects and, move in the direction that the signal grows stronger. As the mobile slave device 294 moves close to the implement 296, the mobile slave device 294 detects an alignment tag 326 or utilizes imaging software to align the slave 294 with the master 296 so that the universal coupling device 318 of each can mate.

Once coupled, the computer 322 on the master 296 communicates with the computer 310 on the slave 294 and the computer 298 at the control center 292. The computer 322 of the master implement 296 also controls all operational functions on the implement 296.

Using the GPS system and mapping functions the mobile slave device 294 locates an operational area 328 such as a field and in conjunction with the computer 322 of the master implement 296 and the computer 298 of the control center 292 to complete the selected protocol. During operation information is transmitted to computer 298 where the information is processed, stored, and/or displayed.

Accordingly, implements and systems have been disclosed that at the very least meets the stated objectives.

What is claimed is:

1. A row planter assembly, comprising:
    a chassis;
    a first track assembly mounted to the chassis;
    a second track assembly mounted to the chassis at a position offset from the first track assembly;
    a seed meter assembly and seed delivery assembly mounted to a rearward end of the chassis;
    a furrow assembly mounted to the chassis forward of the seed delivery assembly; and
    wherein the seed meter assembly has a pair of seed plates mounted to a drive shaft in spaced relation disposed within a housing.

2. The assembly of claim 1 further comprising a downforce control assembly.

3. The assembly of claim 2 wherein the downforce control assembly has a first swing arm connected to a contact wheel at one end and a pair of swing arms connected to the chassis assembly at one end, a first cylinder connected to the second swing arms, and a second cylinder connected to the first swing arm.

4. The assembly of claim 2 wherein the downforce control assembly has a set of support arms in parallel and connected to a fulcrum arm of which the upper support arm is of longer length than the lower support arm, causing the lower section of the fulcrum arm to move in a forward direction when the chassis is moved upwardly, thereby causing the chassis to also move forward.

5. The assembly of claim 1 wherein the furrow assembly has an opening disc; a furrow plow, and a pair of shaping wheels in contact with the sides of the furrow plow.

6. The assembly of claim 5 wherein the opening disc has a tangent convexed cutting edge configured to cut through soil and residue to reduce furrow compaction and improve cutting through residue.

7. The assembly of claim 1 wherein the housing of the seed meter assembly has an outlet port in communication with a discharge conduit that is in communication with a transverse conduit that is in communication with a disc air chamber that is in communication with a makeup air chamber that is in communication with an inlet port.

8. The assembly of claim 1 further comprising a sprayer mounted to the frame downstream from the seed meter assembly and seed delivery assembly.

9. The assembly of claim 8 further comprising a nozzle with a reduced cross sectional area in communication with a pump causing fluid to forcibly flow such that the fluid penetrates the soil to a desired depth without the use of mechanical device.

10. The assembly of claim 1 wherein the seed meter assembly has a sensor mounted between a singulator and a seed drop zone and adjacent a seed disc and connected to a computer, the sensor positioned to monitor the presence of a seed on the seed disc and the computer configured to accelerate a rotational speed of the seed disc when no seed is detected by the sensor on the seed disc.

11. The assembly of claim 1 wherein the seed delivery system includes a pair of flexible discs mounted to a shaft and configured to frictionally hold a seed in place.

12. The assembly of claim 11 wherein the seed delivery system has a first separator positioned to separate the pair of flexible discs to receive a seed from the seed meter assembly and a second separator positioned adjacent a furrow to separate the flexible discs to deliver the seed to the furrow.

* * * * *